United States Patent [19]

Mains et al.

[11] 4,066,587

[45] Jan. 3, 1978

[54] THERMOPLASTIC POLYESTER COMPOSITIONS CONTAINING POLYAMIDE ADDITIVES

[75] Inventors: Harold E. Mains; Frederick R. Williams; William L. O'Brien, all of Cincinnati, Ohio

[73] Assignee: Emery Industries, Inc., Cincinnati, Ohio

[21] Appl. No.: 720,555

[22] Filed: Sept. 7, 1976

[51] Int. Cl.² .................. C08G 63/02; C08L 77/12
[52] U.S. Cl. ......................... 260/22 D; 260/857 PE
[58] Field of Search ................ 260/22 D, 857 PE

[56] References Cited

U.S. PATENT DOCUMENTS

| | | | |
|---|---|---|---|
| 2,663,649 | 12/1953 | Winkler | 260/857 PE |
| 2,889,292 | 6/1959 | Peerman | 260/857 PE |
| 3,178,302 | 4/1965 | Tawn et al. | 260/22 D |
| 3,254,040 | 5/1966 | Aronoff et al. | 260/857 PE |
| 3,650,999 | 3/1972 | Martins et al. | 260/22 D |
| 3,686,069 | 8/1972 | Winkler et al. | 260/857 PE |
| 3,839,245 | 10/1974 | Schlossman et al. | 260/857 PE |
| 3,903,042 | 9/1975 | Gall | 260/857 PE |

FOREIGN PATENT DOCUMENTS

| | | | |
|---|---|---|---|
| 663,079 | 5/1963 | Canada | 260/22 R |
| 1,398,395 | 6/1964 | France | 260/22 D |

*Primary Examiner*—Ronald W. Griffin
*Attorney, Agent, or Firm*—Gerald A. Baracka; John D. Rice

[57] ABSTRACT

The flow characteristics and rheological properties of thermoplastic polyesters and copolyesters are significantly improved by the addition of a polyamide resin thereto. In addition to improving the processability of the thermoplastic materials the polymeric additives also impart other desirable properties to the resulting manufactured products.

13 Claims, No Drawings

THERMOPLASTIC POLYESTER COMPOSITIONS CONTAINING POLYAMIDE ADDITIVES

BACKGROUND OF THE INVENTION

Control of flow or rheological properties of thermoplastic polyesters during processing, such as extrusion, molding, milling and forming into fibers, is necessary. The amount and type of additives employed for this purpose is dependent on the particular polyester used, the other compounding ingredients present in the formulation, the type of processing and the processing conditions.

Numerous additives for thermoplastic polyesters are known and used as flow promoters, friction reducers, release agents, parting agents, spinning aids and the like. For example, when processing polyester fibers ethoxylated fatty esters and emulsified polyethylene, natural and synthetic waxes or mineral oils can be used. Fatty amides or bisamides are also used as lubricating aids when polyesters are extruded. Stearic acid, metal stearates, mono- and dialkylphosphates and their metal soaps, and waxes such as carnauba and candellila, are also commonly used with polyesters in molding applications.

It would be highly desirable and advantageous if additives were available which could be easily incorporated into both fiber-forming and film-forming polyesters and copolyesters, such as poly(ethylene terephthalate), and the structural or engineering-type polyesters and copolyesters including poly(butylene terephthalate).

SUMMARY OF THE INVENTION

We have now quite unexpectedly discovered polymeric additives capable of functioning as multipurpose processing aids for polyesters and copolyesters. The polymeric additives of this invention can be readily incorporated into the polyesters and copolyesters, as compatible with other compounding ingredients typically employed, and do not detract from the desirable physical characteristics of the polymer. Additionally, these additives can be used at relatively high levels to impart other desirable properties to the polymer. Even when used at high levels these polymeric additives do not exude or migrate from the polyester and form an undesirable sticky or oily residue on the surface of the manufactured article. Also, in certain processing operations additional benefits are obtained. For example, in extrusion applications these additives permit the use of lower extrusion temperatures and less power while maintaining throughputs equivalent to the control.

The polymer additives of this invention are high melting polyamides derived from high molecular weight dibasic acids. Polyamide resins of this type are known for adhesive applications and are commonly available, however, it is totally unexpected that these polyamide resins can be advantageously used with polyesters and copolyesters to obtain improved thermoplastic compositions. The discovery is particularly surprising since the general practice throughout the industry has been to avoid the use of polyamides with polyesters since the presence of some free amine is inevitable and generally considered to be detrimental. It is, in fact, surprising that the polyamide additives are even compatible with the polyesters in view of statements such as that found in the Encyclopedia of Polymer Science and Technology, Vol. 10, p. 601, Interscience Publishers (1972) that fatty polyamides (condensation products of di- and polyfunctional amines and di- and polybasic acids obtained by the polymerization of unsaturated vegetable oils or their esters) are generally incompatible with polyesters.

The polyamides of this invention useful as additives for polyesters and copolyesters are high molecular weight products having a number average molecular weight from about 5,000 to 50,000 and, more preferably from about 10,000 to 35,000 obtained by the reaction of essentially stoichiometric amounts of a long-chain, high molecular weight aliphatic or cycloaliphatic dibasic acid containing from about 18 to 52 carbon atoms, and optionally up to about 30 weight percent of a short-chain saturated dibasic acid containing from 2 to 13 carbon atoms, with an aliphatic saturated diamine or mixture of diamines containing from 2 to 10 carbon atoms. The polymeric additives typically have softening points in the range 100° to 240° C with amine values less than 3. Especially useful additives are those polyamides derived from polymeric fatty acids obtained by the dimerization of predominantly $C_{18}$ acids, particularly polymeric fatty acid products containing 75% by weight or more $C_{36}$ dimer acids, and mixed diamines differing in chain length by at least 3 carbon atoms and wherein the longer chain diamine constitutes from 5 to 35 equivalents percent of the total diamine. Even more preferable are those polymeric additives where azelaic acid, sebacic acid, dodecanedioic acid or brassylic acid are employed as part of the dibasic acid charge and the diamine used is a mixture of ethylenediamine and hexamethylenediamine. The polymeric additives constitute 0.01 to 20 weight percent of the polyester of copolyester resin. These additives are especially useful with poly(ethylene terephthalate), poly (butylene terephthalae), and poly(1,4-cyclohexylenedimethylene terephthalate) resins and copolyesters thereof.

DETAILED DESCRIPTION

The present invention relates to the utilization of polyamides derived from long-chain, high molecular weight dibasic acids, particularly polymeric fatty acids, as processing aids for polyesters and copolyesters and to the improved resin compositions and products obtained thereby. The invention has as its objective to provide polyesters and copolyesters which during processing have good flow properties and after processing have a good balance of physical properties. By the use of the polyamide additives of this invention it has been found that the thermoplastic resins can be extruded at lower temperatures while maintaining high throughput without increasing the amount of power required. The enhanced flow characteristics of the resin also facilitate the production of molded goods. The polymeric additives of this invention are multipurpose and in addition to improving the processability of the resin by functioning as a lubricant and flow promoter during molding, milling, extruding and fiber formation they also improve the properties of the resulting product e.g. improve flexibility, improve flexural strength, improve impact resistance and the like. It has also been found that by the use of these additives strains initially present in the molded pieces are relieved upon standing. This feature is particularly useful in production of complex molded articles.

The polyamides useful for this invention are high melting resinous products obtained by the reaction of a long-chain dibasic acid containing 18 or more carbon atoms and a diamine or mixture of diamines. Some short-chain dibasic acids may also be present in the reaction. The long-chain, high molecular weight dibasic acids used in the preparation of the polyamide can be aliphatic or cycloaliphatic hydrocarbon acids containing 18 or more carbon atoms. The acids may be straight-chain, i.e., unbranched, or contain one or more alkyl branches and the carboxyl groups can be located in the terminal positions or randomly throughout the molecule. While the dibasic acids useful for this invention will contain from about 18 to 52 carbon atoms, they preferably will be $C_{21-36}$ dicarboxylic acids or mixtures thereof. Some monobasic acids and/or polybasic acids may be present with the dibasic acid, however, the dicarboxylic acid content should be at least 70% by weight of the acid mixture and, more preferably, greater than 80% by weight.

Dicarboxylic acids suitable for the preparation of the polyamides are obtainable by any of several processes known to the industry. The dibasic acids can be obtained from suitable organic compounds, for example, by ozonolysis of unsaturated carboxylic acids or the catalytic oxidation of saturated and/or unsaturated hydrocarbons. They can also be obtained by oxidation of methyl- or formyl-branched acids such as isostearic acid or formylstearic acid. Carboxystearic acids such as heptadecane-1,3-dicarboxylic acid and heptadecane-1,9-dicarboxylic acid as well as other isomeric acids can be produced in this manner. The radical addition of a short-chain aliphatic acid and unsaturated fatty acid also yields useful dibasic acids. Dicarboxylic acids can also be obtained by the addition of acrylic acid or methacrylic acid and a monobasic acid containing conjugated unsaturation (e.g. linoleic acid). For example, when linoleic acid and acrylic acid are reacted a dibasic acid of the formula

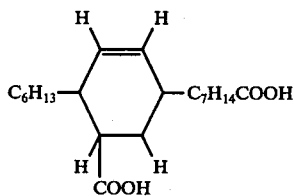

is obtained. These adduct acids are very useful for the preparation of the polyamide resins employed for this invention.

Especially useful dicarboxylic acids for this invention are polymeric fatty acids obtained by the dimerization of unsaturated monocarboxylic acids containing 16 to 26 carbon atoms, such as oleic acid, linoleic acid, linolenic acid and eleostearic acid. Dicarboxylic acids produced in this manner, that is, when two moles of unsaturated monocarboxylic acid are combined, are referred to as dimer acids. Processes for the production of dimer acids are well known to the art and by way of illustration reference may be had to U.S. Pat. Nos. 2,793,219 and 2,955,121.

Dimer acids obtained by the dimerization of $C_{18}$ acids such as oleic acid, linoleic acid and mixtures thereof (e.g. tall oil fatty acids) are especially useful and advantageously employed for the preparation of the polyamide additives. Such dimer acids have as their principal component $C_{36}$ dicarboxylic acid and typically have an acid value in the range 180–215, saponification value in the range 190–205 and neutral equivalent from 265–310. Dimer acids containing unsaturation may be hydrogenated prior to use. Dimer acids containing less than 25% by weight by-product acids, including monobasic acids, trimer acids or higher polymer acids, provide especially useful polyamide resins for this invention and it is particuarly advantageous if the $C_{36}$ polymeric acid has been hydrogenated and molecularly distilled or otherwise purified to increase the $C_{36}$ dimer content to 90% or more.

Reacted with the long-chain, high molecular weight dibasic acid is an aliphatic diamine corresponding to the formula $$H_2N-(CH_2)_n-NH_2$$

where $n$ is an integer from 2 to about 10 and preferably from 2 to 6. Useful saturated aliphatic diamines of the above type include ethylenediamine, propylenediamine, tetramethylenediamine, pentamethylenediamine, hexamethylenediamine, octamethylenediamine, decamethylenediamine and the like. Mixtures of one or more of these diamines may be used, in fact, polyamides prepared from a mixture of ethylenediamine and hexamethylenediamine form a preferred embodiment of this invention. In addition to the above-mentioned saturated aliphatic diamines, which are essential if suitable polyamide additives are to be obtained, one or more additional diamines may also be used but should not constitute greater than about 30 weight percent of the total diamine charge. Preferably such diamines will comprise less than 10 weight percent of the total diamine and include but are not limited to the following: 3,4,5-trimethylhexamethylenediamine, dimer diamine (diamines of dimer acids obtained by the polymerization of oleic acid or similar unsaturated acids), p-xylylenediamine, p-phenylenediamine, 1-methyl-2,4-diaminobenzene, N,N'-dimethylphenylenediamine, 1,4-diaminocyclohexane, bis-(p-aminocyclohexyl) methane, N,N'-dimethyl-1,4-diaminocyclohexane, piperazine, 2,5-dimethylpiperazine, isophoronediamine, N-oleyl-1,3-diaminopropane, N-coco-1,3-propylenediamine, methylimino-bis-propylamine and the like.

In addition to the long-chain, high molecular weight dibasic acids, there may also be present and it is often advantageous to include a short-chain saturated aliphatic dibasic acid containing from 2 to 13 carbon atoms, and more preferably, from 6 to 13 carbon atoms. The amount of the short-chain dibasic acids should not, however, exceed about 30 weight percent of the total dibasic acid charge. Useful short-chain acids include oxalic acid, malonic acid, succinic acid, glutaric acid, adipic acid, suberic acid, pimelic acid, azelaic acid, sebacic acid, dodecanedioic acid, brassylic acid and the like.

Polyamides obtained by reaction of the above-described reactants and useful for this invention have number average molecular weights from 5,000 up to about 50,000 and, more preferably, in the range 10,000 to 35,000. The polyamide resins have softening points from about 100° C to 240° C, however, superior results are obtained when the softening point of the resin is in the range 150°–210° C. The polyamides must have amine values less than three, and preferably less than one, if they are to be useful as polymeric additives for polyesters. Such resins are obtained by reacting essentially stoichiometric amounts of the diamine or mixture of diamines with the high molecular weight dibasic acid or mixture of high molecular weight and short-chain dibasic acids. In other words a balanced or essentially balanced reaction is necessary and the reaction should be carried to completion or near completion, i.e. essentially zero amine value.

As indicated the equivalents ratio of the diamine (total) and dibasic acid (total) will be essentially 1:1 to obtain the polymeric additives. The dicarboxylic acid charge may contain up to about 30 weight percent of a saturated $C_{2-13}$ aliphatic dicarboxylic acid. Preferably saturated aliphatic dibasic acids containing from about 6 to 13 carbon atoms will be present in an amount from about 1 to 20 weight percent of the total dibasic acid charge. While a single diamine component may be employed for the preparation of the polymeric additive, a mixture of two diamines provides especially useful polyamides particularly when the diamines differ by at least three carbon atoms. In such mixtures the longer chain diamine will constitute from about 5 to 35 percent of the total diamine equivalents and, more preferably, from about 10 to 30 equivalents percent. The shorter chain diamine will make-up the remainder of the diamine charge. Mixtures of ethylenediamine and 1,6-hexamethylenediamine have been found to be particularly advantageous and form a preferred embodiment of this invention especially when reacted in the above-defined ratios with a mixture of $C_{36}$ dimer acid and azelaic, sebacic, dodecanedioic or brassylic acids. While considerable compositional variation is possible with the polyamide additives the amount and type of the various dibasic acid and diamine components making up the charge are designed to provide a homogeneous product with the highest possible viscosity and melting point for that particular molecular weight.

The polyamides are obtained by heating the diamine and dicarboxylic acid components in a suitable reactor arranged to permit water of condensation formed during the reaction to be removed from the system. A variety of condenser/trap arrangements are acceptable for this purpose. The reaction can be conducted as a batch, continuous or semi-continuous operation. Reaction is achieved by heating the reaction mixture in the temperature range 150°–280° C, preferably 180°–250° C, until evolution of water ceases and a negative test for free amine is obtained. Reaction times can vary from 4 to 24 hours depending on the particular reactants employed and the maximum reaction temperature. More usually reaction times range from 6 to 10 hours. An inert gas may be bubbled through the reaction mixture to facilitate removal of water. During the latter stages of the reaction it may be advantageous to reduce the pressure to remove the final traces of water. At the end of the reaction the polyamide may be cooled and used as such or stabilizers, ultraviolet absorbers or the like added.

The polyamide additives are useful with a wide variety of polyesters and copolyesters and generally will be present in an amount ranging from about 0.01 to 20%, and more preferably 0.1 to 10% by weight based on the weight of the resin. In general, the polyesters are obtained by the reaction of an aliphatic saturated glycol of the formula

HO⫽CH$_2$⫽OH where x is an integer from about 2 to 10 with a dicarboxylic acid or ester thereof, preferably a $C_{1-4}$ alkyl ester. Typical glycols include ethylene glycol, 1,3-propanediol, 1,4-butanediol, 1,6-hexanediol, 1,8-octanediol and the like. Cycloaliphatic diols such as 1,4-cyclohexanedimethanol can also be employed. Terephthalic acid and dimethyl terephthalate form especially useful polyesters particularly when the diol is ethylene glycol, 1,4-butanediol or 1,4-cyclohexanedimethanol. While the polymeric additives are particularly effective processing aids for poly(ethylene terephthalate), poly(butylene terephthalate) and poly(1,4-cyclohexylenedimethylene terephthalate) they are equally effective with copolyesters which contain the elements of one or more additional reactants in minor proportions. Such co-reactants can include other dicarboxylic acid components such as isophthalic acid, adipic acid, suberic acid, succinic acid, carbonic acid, oxalic acid, glutaric acid, fumaric acid, sebacic acid, azelaic acid, dimer acid and esters of these acids. Brominated diols and brominated dicarboxylic acids, esters or anhydrides and the ethoxylated derivatives thereof such as 2,5-dibromoterephthalic acid, tetrachlorophthalic anhydride, tetrabromophthalic anhydride, chlorendic anhydride, brominated 1,4-butanediol, 2,2-bis(bromoethyl) propane-1,3-diol, 1,4-di(2-hydroxyethoxy)-2,5-dibromobenzene, 2,2-bis[3,5-dibromo-4-(2-hydroxyethoxy)phenyl]propane, diethoxylated 3,5-dibromo-4-hydroxybenzoic acid and the like are also advantageous. The use of such brominted co-reactants is particularly desirable when flame retardant copolyesters are desired. To improve disperse dyeability of the copolyester small amounts of adipic acid or azelaic acid are often employed. Sulfonated isophthalic acid can be reacted into the copolyester to improve the basic dyeing properties in textile applications. While numerous co-reactants can be employed for a variety of purposes the amount of said co-reactants will generally not exceed about 10 mol percent of the copolyester and preferably will be less than 5 mol percent.

The polyamide additives of this invention can be incorporated into the resin using conventional processing equipment and do not require special mixing or handling. Furthermore, these additives are compatible with other known additives typically employed in thermoplastic polymer formulations such as stabilizers, lubricants, plasticizers, delusterants, dyes, pigments, antistatic agents and the like. The additives of this invention are also useful with filled resin compositions such as glass fiber or mineral filled polyesters.

The polyamide processing aids of this invention also find application in blends of polyesters and copolyesters with other polymeric materials. Polymers which can be blended with the polyesters and copolyesters include, for example, polyethylene, polypropylene, polyisobutylene and other polyolefins including copolymers and terpolymers such as copolymers of ethylene and butene-1 or propylene and terpolymers of ethylene and propylene with diolefinic termonomers; ethylene-vinylacetate copolymers; butadiene-acrylonitrile copolymers and acrylonitrile-butadiene-styrene terpolymers; poly(vinyl chloride) and poly(vinylidene chloride) homopolymers and copolymers; polysulfones; polyacetal homopolymers and copolymers; polyphenylene ethers; silicone polymers; and the like. Additionally, the polymeric processing aids are useful with blends of two or more polyesters and/or copolyesters.

The following examples will illustrate the invention more fully. In these examples all parts and percentages are given on a weight basis unless indicated otherwise.

EXAMPLE I

A glass reactor equipped with a stirrer, nitrogen inlet, thermometer and condenser fitted with a water trap was charged with 0.242 equivalent dimer acid (Empol ®1010 dimer acid containing 97% dibasic acid) and 0.161 equivalent azelaic acid. Several drops 50% aqueous hypophosphorous acid were added and the reaction mixture heated to 180°-190° C with stirring under a slight nitrogen flow. A mixture of diamines consisitng of 0.073 equivalent hexamethylenediamine and 0.322 equivalent ethylenediamine was slowly added over a period of about one hour while maintaining the temperature and removing water of condensation. The reaction mixture was heated to about 230°-250° C until the bulk of the water was removed and a vacuum of 5-20 Torr then applied to the system to remove the final traces of water. The vacuum was broken with nitrogen, the product discharged from the reaction vessel and cooled. The resulting polyamide had a softening point of 190° C (ASTM D28-67), 0.7 amine value (ASTM D2074-66), viscosity of 76 poise at 220° C (ASTM D445-65) and tensile strength (psi) and elongation (%) of 1800 and 400, respectively, determined using ASTM test method D882-67.

EXAMPLE II

The polyamide resin of Example I was blended with poly(butylene terephthalate). The blended compositions were formulated to contain 2 and 10 weight percent of the additive. In addition to the polyamide additive the resin contained six grams zinc stearate per 100 pounds resin as an external lubricant. The compositions were then extruded using a three inch, 24 to 1, extruder with an eight-hole die and a temperature profile of 420° F (Zone 1), 440° F (Zone 2), 440° F (Zone 3), 440° F (Zone 4) and 440° F (die). A control resin containing only the zinc stearate additive was also extruded using the same temperature profile. Results of the extrusion were as follows:

| Resin | Screw Speed (rpm) | Power (amps) | Output (lbs/hr) |
|---|---|---|---|
| Control | 39 | 25 | 140 |
| Containing 2% Polyamide Additive | 41 | 23 | 150 |
| Containing 10% Polyamide Additive | 41 | 20 | 150 |

From the above data is is readily apparent that the addition of the polyamide additive greatly improves the extrusion efficiency. It is also apparent that greater output can be achieved without increasing the power requirements of the extruder or, conversely, the same output can be achieved with reduced power consumption. Employing only 2% of the polyamide additive with the poly(butylene terephthalate) resulted in a 7% increase in output with an 8% reduction in power consumption. In addition to these advantages the products containing the polyamide additive were easily pelletized and there was no substantial decrease in the rate of crystallization. Since extruder temperatures can be reduced by the use of these processing aids product degradation during processing is minimized.

In addition to being an effective processing aid at low levels the additive does not significantly modify the mechanical and thermal properties of the poly(butylene terephthalate). To demonstrate this point a comparison of the modified resin containing 2% polyamide and unmodified resin was made and the results were as follows:

| | Unmodified Resin | Modified Resin |
|---|---|---|
| Impact (ft. lbs/inch notch) ASTM D256 | 0.52 | 0.50 |
| Tensile Strength At Yield (psi) - ASTM D638 | 8,700 | 8,500 |
| Elongation At Fail (%) ASTM D638 | 23 | 11 |
| Elastic Modulus (psi) ASTM D638 | 340,000 | 340,000 |
| Flexural Strength At Yield (psi) - ASTM D790B | 12,700 | 12,400 |
| Flexural Modulus (psi) ASTM D790B | 360,000 | 360,000 |

The melt point of the modified and unmodified resins, as determined by differential scanning calorimetry, was not appreciably different.

The polyamide additive was also incorporated into the poly(butylene terephthalate) at a 20 weight percent level. In addition to improving the processing characteristics of the resin, the rate of crystallization of the extruded poly(butylene terephthalate) was not substantially decreased. The use of high levels of the polyamide also permits the processing of some previously unextrudable blends.

EXAMPLE III

The polyamide resin of Example I was blended with a clear, amorphous, grade poly(ethylene terephthalate) resin in a high-speed Henschel mixer for two minutes and the blend containing two weight percent of the polyamide extruded. The extrusion was conducted as described in Example II except that the temperature profile was 500° F, 550° F, 550° F, 550° F and 550° F. The processability of the blend was greatly improved over the control resin which contained none of the polyamide additive. Similar improved processability was observed using a dry crystallized grade of poly(ethylene terephthalate).

EXAMPLE IV

To further demonstrate the effectiveness of the polyamide additives a mineral filled resin composition was prepared as follows:

| Poly(ethylene terephthalate) | 69 parts |
|---|---|
| Talc | 30 parts |
| Polyamide Additive | 1 part |

The ingredients were blended in a Henschel high-speed mixer and the blend extruded using a 4½ inch, 24 to 1 vented extruder with a temperature profile of 500° F, 520° F, 520° F, 520° F and 540° F. Good mixing was obtained at an output of 350 lbs/hr with a screw speed of 40 rpm using the blend containing the polyamide additive. A filled composition not containing the polyamide additive was difficult to extrude and marked variations in the output were obtained because of poor mixing.

EXAMPLE V

Using a procedure similar to that described in Example I, 0.261 equivalent $C_{36}$ dimer acid, 0.112 equivalent azelaic acid, 0.073 equivalent hexamethylenediamine and 0.292 equivalent ethylenediamine were reacted to produce a high molecular weight polyamide resin having a softening point of 175° C, tensile strength of 2000 psi and elongation of 320%. When this polyamide is incorporated in poly(ethylene terephthalate), poly(butylene terephthalate) or poly(1,4-cyclohexylenedimethylene terephthalate) at levels ranging from about 1% up to about 10% marked improvement in the processing characteristics and rheological properties of the blends is observed.

EXAMPLE VI

The poly(butylene terephthlate) composition of Example II containing 10% polyamide was extruded into monofilaments. The filaments were obtained without difficulty and both the oriented and unoriented filaments exhibited useful characteristics. Also, a blend of poly(butylene terephthalate) and 20 weight percent polyamide was extruded using a 2½ inch extruder with a 4-hole die and a temperature profile of 420° F, 440° F, 440° F, 440° F and 460° F. The gauge of the original filament obtained from the extruder was 0.100", however, the filaments were heat stretched (4:1 ratio) so that the final filament gauge was 0.050 inch. The processability of these blends was excellent and no difficulties were encountered during the extruding and drawing operations. Also, the draw tension required to heat stretch the 0.050 inch filament was about half that required to produce a similar gauge filament using poly(butylene terephthalate) not containing the polyamide additive.

EXAMPLE VII

A polyamide resin was obtained by reacting 0.289 equivalent $C_{36}$ dimer acid, 0.050 equivalent azelaic acid, 0.063 equivalent hexamethylenediamine and 0.250 equivalent ethylenediamine in accordance with the procedure described in Example I. The resulting polyamide resin had a softening point of 137° C and tensile strength of 810 psi at 170% elongation. This resin is an effective additive for poly(ethylene terephthalate) and brominated copolyesters to improve the processing characteristics of the resins.

EXAMPLE VIII

Blends of both poly(ethylene terephthalate) and poly(butylene terephthalate) containing 2% of the polyamide of Example I were injection molded in accordance with the standard recommended practice for injection molding specimens of thermoplastic materials (ASTM D1130-63) employing a mold design as shown in FIG. 4 of ASTM D647. The compositions containing the polyamide additive exhibited superior processbility as compared to resins which did not contain the additive and the character of the moldings was also significantly improved.

EXAMPLE IX

The polyamide of Example I was blended with a clear amphorous copolyester derived from terephthalic acid, isophthalic acid and cyclohexamethylene dimethanol (Kodar A 150). The blend containing 2 weight percent of the polyamide was extruded as described in Example II except that the temperature profile was 480° F, 480° F, 480° F, 500° F and 480° F. The processability of the blend was greatly improved over the control resin which contained none of the additive and the power required was decreased by 5%.

We claim:

1. A method for improving the flow characteristics and rheological properties of thermoplastic polyester and copolyester resins which comprises incorporating therein 0.01% to 20% by weight of a polyamide having a number average molecular weight from about 5,000 to 50,000 obtained by the reaction of a high molecular weight aliphatic or cycloaliphatic dibasic acid containing from 18 to 52 carbon atoms and up to 30 weight percent, based on the total acid charge, of a short-chain, saturated, aliphatic dibasic acid containing from 2 to 13 carbon atoms with an aliphatic saturated diamine containing from 2 to 10 carbon atoms or a mixture of said diamines.

2. The method of claim 1 wherein the polyamide has a softening point in the range 100° C and 240° C and amine value less than 3.

3. The method of claim 1 wherein the thermoplastic resin is selected from the group consisting of poly(ethylene terephthalate), poly(butylene terephthalate), poly(1,4-cyclohexylenedimethylene terephthalate) and copolyesters thereof.

4. The method of claim 1 wherein the polyamide is derived from a high molcular weight dibasic acid containing 75% or more $C_{36}$ dimer acid obtained by the dimerization of $C_{18}$ unsaturated monocarboxylic acids.

5. The method of claim 4 wherein the high molecular weight dibasic acid has an acid value in the range 180 to 215, saponification value in the range 190 to 205 and neutral equivalent from 265 to 310.

6. The method of claim 5 wherein the high molecular weight dibasic acid is hydrogenated and contains 90% or more $C_{36}$ dimer acid.

7. The method of claim 4 wherein the short-chain, saturated, aliphatic dibasic acid contains from 6 to 13 carbon atoms and constitutes from 1 to 20 weight percent of the total dibasic acid charge and the diamine is a mixture of two diamines, said diamines differing by at least 3 carbon atoms with the longer chain diamine constituting from about 5 to 35%, based on equivalents, of the total diamine charge.

8. The method of claim 7 wherein the thermoplastic resin is selected from the group consisting of poly(ethylene terephthalate), poly(butylene terephthalate), poly(1,4-cyclohexylenedimethylene terephthalate) and copolyesters thereof and the polyamide has a number average molecular weight in the range 10,000 to 35,000, softening point in the range 150° C to 210° C and amine value less than one and is present in an amount from 0.1 to 10% by weight.

9. An improved resin composition comprising a thermoplastic polyester or copolyester resin and from 0.01 to 20% by weight, based on the weight of said resin, of a high molecular weight polyamide obtained by the reaction of a high molecular weight aliphatic or cycloaliphatic dibasic acid having from 18 to 52 carbon atoms and up to 30 weight percent, based on the total dibasic acid charge, of a short-chain, saturated, aliphatic dibasic acid containing from 2 to 13 carbon atoms with an aliphatic, saturated diamine containing from 2 to 10 carbon atoms or a mixture of said diamines, said polyamide having a number average molecular weight from about 5,000 to 50,000 a softening point in the range 100° C to 240° C and amine value less than three.

10. The composition of claim 9 wherein the thermoplastic resin is selected from the group consisting of poly(ethylene terephthalate), poly (butylene terephthalate), poly(1,4-cyclohexylenedimethylene terephthalate) and copolyesters thereof and the polyamide is derived from a high molecular weight dibasic acid containing 75% or more $C_{36}$ dimer acid, obtained by the dimerization of $C_{18}$ unsaturated monocarboxylic acids, and having an acid value in the range 180 to 215, saponification value in the range 190 to 205 and neutral equivalent from 265 to 310, from 1 to 20 weight percent, based on the total dibasic acid charge, of a saturated, aliphatic dibasic acid containing from 6 to 13 carbon atoms and a mixture of two diamines, said diamines differing by at least three carbon atoms with the long-chain diamine constituting from about 5 to 35%, based on equivalents, of the total diamine charge.

11. The composition of claim 10 wherein the polyamide constitutes from 0.1 to 10% by weight of the resin.

12. The composition of claim 11 wherein the polyamide has a number average molecular weight in the range 10,000 to 35,000, a softening point in the range 150° C to 210° C and amine value less than one.

13. The composition of claim 11 wherein the high molecular weight dibasic acid is hydrogenated and contains 90% or more $C_{36}$ dimer acid and the diamine is a mixture of ethylenediamine and hexamethylenediamine.

* * * * *